(12) United States Patent
Gunnarsson et al.

(10) Patent No.: US 7,881,722 B2
(45) Date of Patent: Feb. 1, 2011

(54) SELECTION OF AN UPLINK CARRIER FREQUENCY CORRESPONDING TO ONE OF CO-SITED CELLS HAVING DIFFERENT COVERAGE AREAS AND SUPPORTING DIFFERENT UPLINK DATA RATES

(75) Inventors: Frederik Gunnarsson, Linköping (SE); Bo Hagerman, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 765 days.

(21) Appl. No.: 11/730,575

(22) Filed: Apr. 2, 2007

(65) Prior Publication Data

US 2008/0242308 A1  Oct. 2, 2008

(51) Int. Cl.
*H04W 72/00* (2009.01)
(52) U.S. Cl. .................. 455/450; 455/435.2; 455/443; 455/448
(58) Field of Classification Search .................. 455/436, 455/443, 333, 448, 450, 452.2, 456.2; 370/328, 370/332
See application file for complete search history.

(56) References Cited

U.S. PATENT DOCUMENTS

| | | | |
|---|---|---|---|
| 5,357,599 A | 10/1994 | Kallin et al. | |
| 2002/0071480 A1* | 6/2002 | Marjelund et al. | 375/141 |
| 2004/0109431 A1* | 6/2004 | Abrahamson et al. | 370/342 |
| 2004/0202136 A1* | 10/2004 | Attar et al. | 370/333 |
| 2006/0209882 A1* | 9/2006 | Han et al. | 370/465 |
| 2006/0252377 A1* | 11/2006 | Jeong et al. | 455/67.13 |

FOREIGN PATENT DOCUMENTS

| | | |
|---|---|---|
| EP | 1022920 | 7/2000 |
| WO | WO 98/52374 | 11/1998 |
| WO | WO 2005/114920 | 12/2005 |

OTHER PUBLICATIONS

3GPP TS 25.214 V7.4.0 (Mar. 2007), $3^{rd}$ Generation Partnership Project; Technical Specification Group Radio Access Network; Physical layer procedures (FDD) (Release 7), pp. 1-76.
3GPP TS 25.331 V7.3.0 (Dec. 2006), $3^{rd}$ Generation Partnership Project; Technical Specification Group Radio Access Network; Radio Resource Control (RRC); Protocol Specification (Release 7), pp. 1-1009.
International Search Report and Written Opinion mailed Sep. 2, 2008 in corresponding PCT Application PCT/SE2008/050304.

* cited by examiner

*Primary Examiner*—Jinsong Hu
*Assistant Examiner*—Michael Nguyen
(74) *Attorney, Agent, or Firm*—Nixon & Vanderhye P.C.

(57) ABSTRACT

Random access coverage is assured while at the same supporting high uplink data rates in a same service area served by a base station. The service area includes first and second co-sited cells. The first co-sited cell is associated with a first uplink frequency, and the second co-sited cell is associated with a second uplink frequency. The first cell allows a lower uplink load and provides a greater coverage than the second cell. The second cell allows a higher rise over thermal (RoT) value than the first cell. Random access channel requests are initially directed to the first cell using the first uplink frequency. One of the co-sited cells is selected for supporting the connection depending on one or more factors. Example factors include a priority associated with the mobile terminal, a capability associated with the mobile terminal, a load situation in the second cell, or radio channel conditions associated with the mobile radio terminal.

25 Claims, 5 Drawing Sheets

SELECTION OF AN UPLINK CARRIER FREQUENCY CORRESPONDING TO ONE OF CO-SITED CELLS HAVING DIFFERENT COVERAGE AREAS AND SUPPORTING DIFFERENT UPLINK DATA RATES

TECHNICAL FIELD

The technical field relates to mobile radio communications, and in particular, to uplink communications involving mobile radio terminals in a mobile radio communications system.

BACKGROUND

Universal Mobile Telecommunications System (UMTS) is a 3rd Generation (3G) asynchronous mobile communication system operating in Wideband Code Division Multiple Access (WCDMA) based on European systems, Global System for Mobile communications (GSM) and General Packet Radio Services (GPRS). In the 3GPP release 99, the radio network controller (RNC) controls resources and user mobility. Resource control includes admission control, congestion control, and channel switching which corresponds to changing the data rate of a connection. A dedicated radio connection is carried over a dedicated channel DCH, which is realized as a DPCCH (Dedicated Physical Control Channel) and a DPDCH (Dedicated Physical Data Channel).

The Long Term Evolution (LTE) of UMTS is under discussion by the 3rd Generation Partnership Project (3GPP) which standardized UMTS. The objective of the LTE work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

A mobile radio terminal, often referred to as a user equipment (UE), in an idle state monitors system information broadcast by base stations within range to inform itself about "candidate" base stations in the service area. When a mobile terminal needs access to services from a UMTS radio access network, it sends a request over a random access channel (RACH) to an RNC via a suitable base station, typically a base station with the most favorable radio conditions. Because the uplink propagation conditions are usually only approximately known, the mobile terminal gradually increases its transmission power over the RACH until either the base station acknowledges the message or a predetermined number of unsuccessful access attempts has been reached. But assuming the mobile terminal is admitted access, the RNC initiates a radio communications connection or link via the most suitable base station if there are available radio resources. Uplink coverage is thus a necessity for successful random access.

There is a trade-off between uplink coverage and uplink enabled peak transmission rates over the radio interface. This trade-off is even more pronounced in systems that provide enhanced uplink communications supporting higher uplink data rates than typical dedicated channels. The uplink radio resources in a cell are limited by the rise over thermal (RoT) that the cell can tolerate. The RoT is the total received power at the base station divided by the thermal noise in the cell, and the cell coverage is limited by a maximum RoT. The maximum RoT is either determined based on coverage requirements and/or uplink power control stability requirements. When only one UE is transmitting over an uplink connection in the cell, both power control stability and coverage are minor issues because the uplink interference is likely to be dominated by the power generated by this user. In this situation, a higher maximum RoT may be used to allow a higher signal-to-interference ratio Ec/Io, which enables higher uplink bit rates. But in order to use the higher uplink bit rates, the user connections have to provide high Ec/Io, which implies high RoT.

Cells operating at high RoT will have limited coverage. Higher RoTs may make it difficult or even impossible for mobile terminals to successfully complete random access from some parts of the cell service area. Furthermore, the gradual power increase by mobile terminals requesting access may generate significant interference in the cell, which decreases the signal-to-interference ratio Ec/Io, which negatively impact the uplink mobile terminal data rate. But without regulation, mobile terminals may request higher uplink data rates and be permitted to transmit at higher uplink data rates even though they may not be capable of or will even benefit from being permitted to transmit at higher uplink data rates.

SUMMARY

Random access coverage is assured and high uplink data rates are supported in a service area served by a base station. The service area includes first and second co-sited cells. The first co-sited cell is associated with a first uplink radio frequency carrier, and the second co-sited cell is associated with a second uplink radio frequency carrier. The first co-sited cell allows a lower uplink load and provides a greater coverage than the second co-sited cell in order to provide the desired random access coverage. The second co-sited cell allows a higher rise over thermal (RoT) value than the first cell.

In response to a random access request for a communications connection involving the mobile radio terminal, one of the first and second co-sited cells is selected to support the communications connection between the mobile radio terminal and the base station. The selection depends on one or more factors including a priority associated with the mobile terminal, a capability associated with the mobile terminal, an uplink load of the second co-sited cell (e.g., whether the uplink load exceeds a configurable load threshold), or current radio channel conditions associated with the mobile terminal and the second co-sited cell. The communications connection is then controlled so that the mobile radio terminal transmits to the base station using the uplink radio frequency carrier associated with the selected cell. Non-limiting examples include the initial set up of the communications connection in the selected cell or a handover of the connection into the selected co-sited cell.

A cell selection parameter is determined for directing random access channel requests from mobile radio terminals. That parameter may be transmitted from one or both of the first and second co-sited cells. It biases mobile radio terminals towards using the first uplink radio frequency carrier associated with the first cell for random access requests. The cell selection parameter includes one or more cell offset values broadcasted in a system broadcast message from one or both of the first and second co-sited cells.

If, based on the one or more factors, it is determined that the requested communications connection is not permitted in the second co-sited cell at a higher uplink data rate, then the first co-sited cell is selected. As a result, the requested communications connection with the mobile terminal is set up in (or handed over to) the first cell over the first uplink radio frequency carrier. On the other hand, if based on the one or more factors, it is determined that a requested uplink connection with the mobile terminal is permitted in the second cell at a higher uplink data rate, the second cell is selected. The requested communications connection is set up (or handed over to) in the second cell at the higher uplink data rate over the second uplink radio frequency carrier. In one non-limiting example, the second co-sited cell may be selected if the mobile terminal is capable of transmitting at the higher uplink data rate, the load situation in the second cell will permit the mobile terminal to transmit at the higher uplink data rate in the second cell, and current radio channel conditions associated with the mobile radio terminal in the second cell will permit the mobile terminal to transmit at the higher uplink data rate in the second cell.

Non-limiting example criteria may be used to determine whether current radio conditions are favorable for transmission at the higher uplink data rate in the second cell. A maximum uplink signal-to-interference ratio associated with an uplink connection to the base station in the second cell is determined. The maximum uplink signal-to-interference ratio associated with the mobile terminal is compared to a threshold. Based on the comparison, a determination is made whether the uplink connection may be permitted to transmit at the uplink higher data rate in the second cell. A higher maximum signal-to-interference ratio corresponds to a higher possible maximum data rate. The maximum uplink signal-to-interference ratio associated with the mobile terminal may be determined based on a maximum transmit power of the mobile terminal, base station receiver uplink amplifier information, a rise over thermal value for the second cell, and a path gain associated with the second cell. If the maximum uplink signal-to-interference ratio associated with the mobile terminal exceeds the threshold, then the second cell may be selected, and the requested communications connection is configured to support the higher uplink data rate with the mobile terminal in the second cell over the second uplink radio frequency carrier.

Non-limiting example application may implement this technology in a radio network controller coupled to the base station in a universal mobile telecommunications system (UMTS) mobile radio communications system or in a base station in a long term evolution (LTE) mobile radio communications system.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

It will be apparent to one skilled in the art that other embodiments may be practiced apart from the specific details disclosed below. The technology is described in the context of a 3GPP UMTS system and an evolved 3GPP UMTS system in order to provide an example and non-limiting context for explanation. But this technology may be used in any modern cellular communications system that can supports multiple uplink random access frequency carriers.

Figure 1:
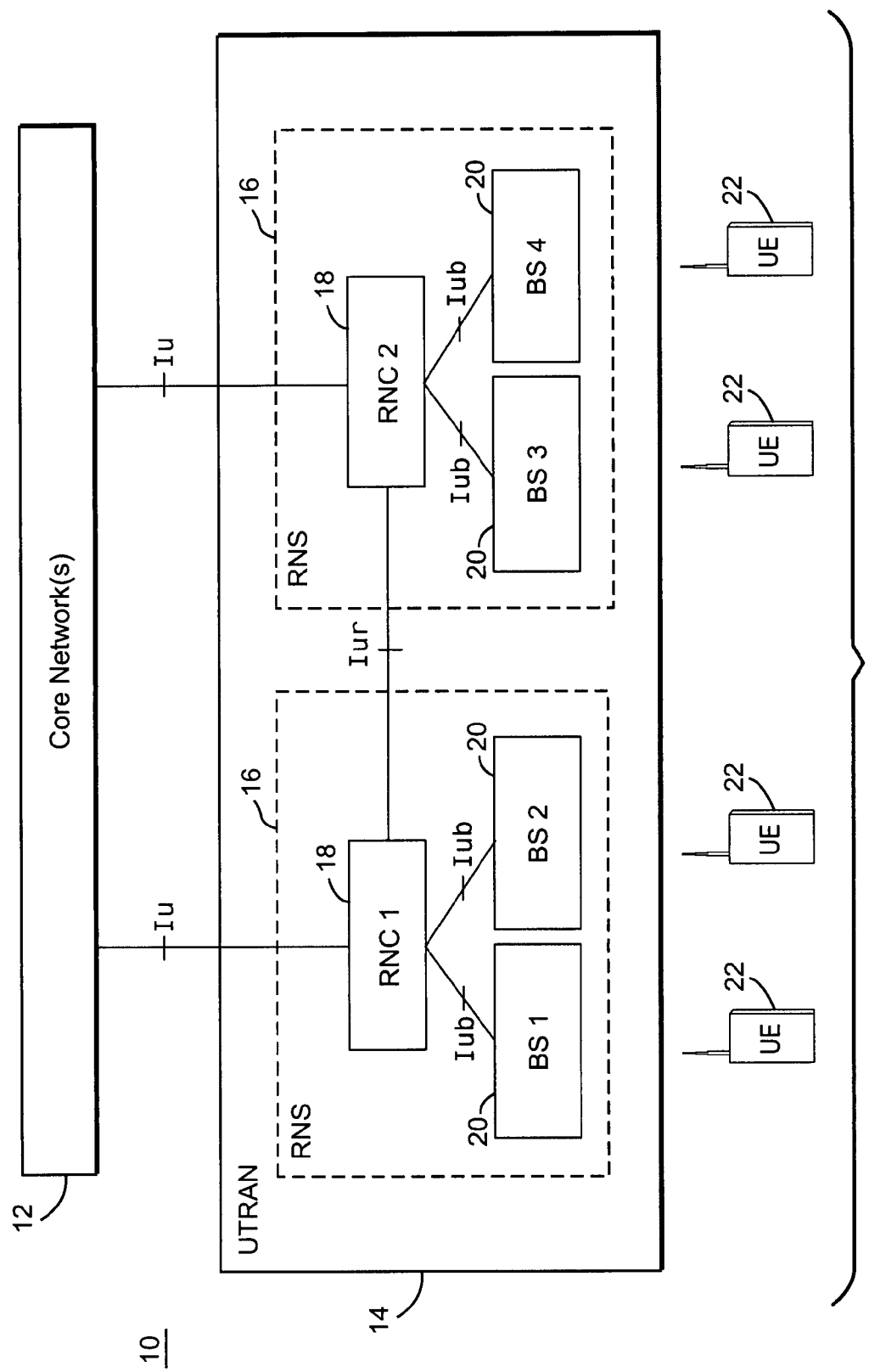
FIG. 1 a block diagram of an example UTRAN mobile radio communications system.

FIG. 1 illustrates a non-limiting example of a third generation, WCDMA-based cellular radio communication system 10. The User Equipment (UE) 22 is the mobile radio terminal by which a user/subscriber can access services offered by the operator's Core Network(s) 12. Those networks are coupled to other networks such as the public switched telephone network (PSTN) and the Internet (not shown). The UMTS Terrestrial Radio Access Network (UTRAN) 14 is responsible for the establishment and control of radio connections with the mobile UEs. The Radio Network Subsystem (RNS) 16 controls a number of Base Stations (BSs) 20 in the UTRAN 14. Each base station 20 coordinates radio communications in one or more cells. A cell covers a geographical area and is identified by a unique identity broadcast in the cell by its base station. There may be more than one cell covering the same geographical area, and in this case, two of the base station cells may be co-sited. Each Radio Network Controller (RNC) 18 controls radio resources and radio connectivity within a set of cells.

FIG. 1 shows interfaces connecting the different nodes in the UTRAN 14. The Iu interface is defined between the core network 12 and the UTRAN 14. The Iur interface is defined for communications between RNCs 18. The Iub interface is defined for communications between the RNC 18 and its base stations 20. User data is transported on transport bearers over these interfaces. Depending on the transport network used, these transport bearers may be mapped to AAL2 connections (in case of an ATM-based transport network) or UDP connections (in case of an IP-based transport network).

Figure 2:
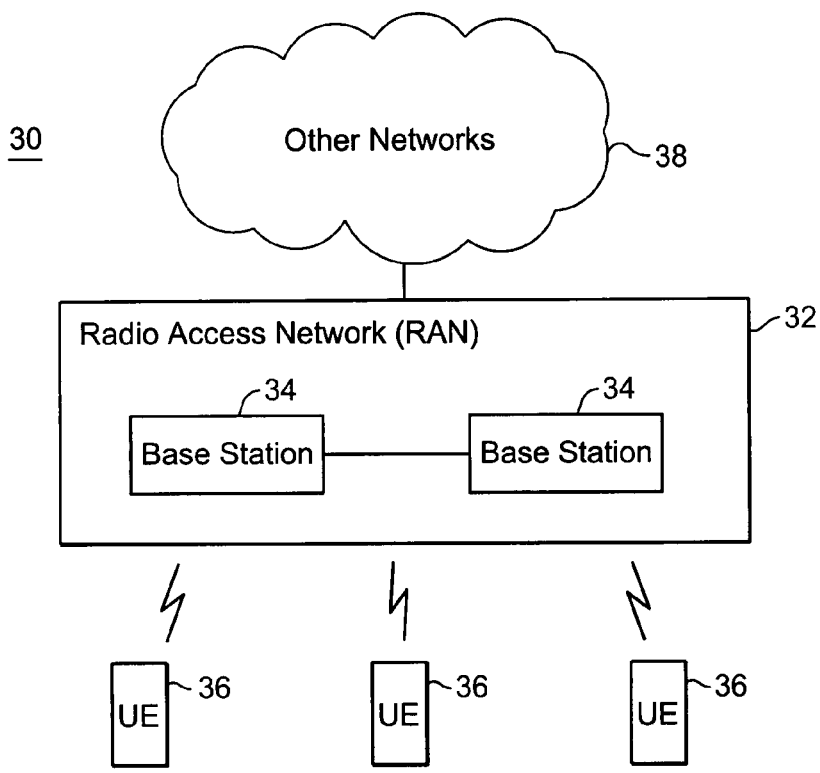
FIG. 2 a block diagram of an example LTE mobile radio communications system.

FIG. 2 illustrates an LTE mobile communication system 30. A radio access network (RAN) 32 is coupled to one or more other networks 38 such as one or more core network nodes and one or more external networks such as the public switched telephone network (PSTN) and the Internet. The RAN 32 includes base stations 34 that communicate with each other, e.g., for handover and other coordinated functions. The base stations communicate over the radio/air interface with mobile radio terminals also referred to as user equipment (UE) 36. At least some of the operations that would be performed in the RNC in the UMTS system 10 shown in FIG. 1 are performed in the base stations in the LTE system 30.

Figure 3:
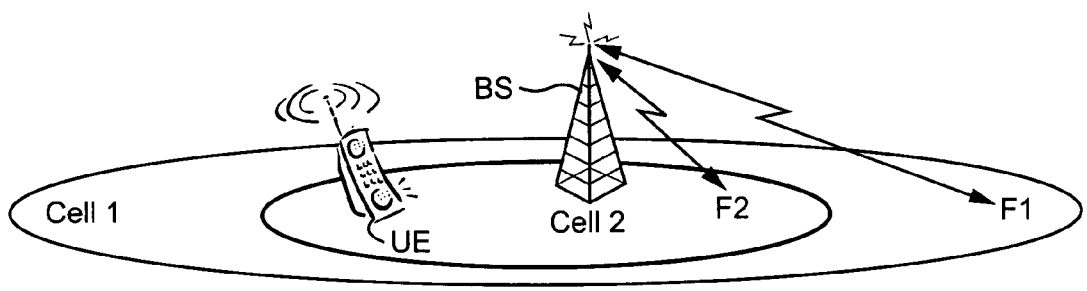
FIG. 3 illustrates a base station providing service for two co-sited cells having different uplink radio carrier frequencies.

For the technology described, it is assumed that the operator of the mobile radio communications system, such as the example systems shown in FIGS. 1 and 2, may use more than one frequency band for uplink communication in each base station service area. FIG. 3 shows a base station service area that includes two co-sited cells 1 and 2. The uplink coverage of two co-sited cells is different because each cell allows a different RoT. The larger cell 1 uses an uplink radio frequency carrier F1 and a RoT aimed for full uplink coverage. The smaller cell 2 uses an uplink radio frequency carrier F2 and a higher RoT aimed at allowing high bit rates. Cell 1 ensures random access coverage for mobile terminals in the base station's full service area, and cell 2 supports high uplink data rates, albeit in a smaller portion of that service area.

Figure 4:
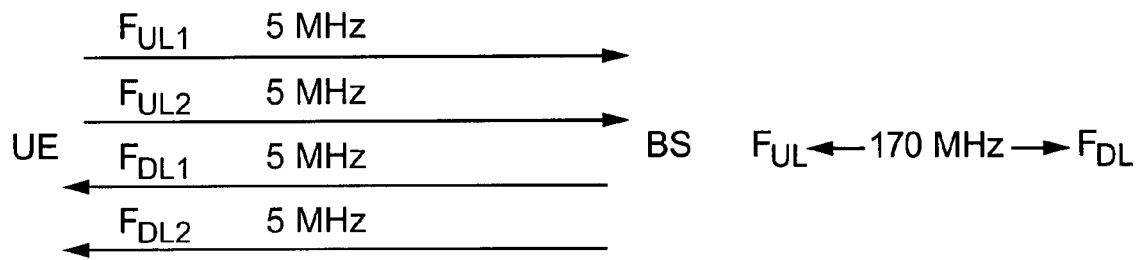
FIG. 4 is a diagram showing multiple uplink and downlink radio carrier frequencies.

FIG. 4 is a diagram showing a non-limiting example of multiple uplink and downlink radio carrier frequencies. The two different RF carrier frequencies shown in FIG. 3 are uplink frequencies $F_{UL1}$ and $F_{UL2}$ corresponding to the first and second cells each having, in this example, a different 5 MHz frequency band. The base station employs two different downlink frequencies $F_{DL1}$ and $F_{DL2}$ corresponding to the first and second cells each having in this example a different 5 MHz frequency band. The uplink frequencies and downlink frequencies may be separated by 170 MHz.

Cell 1 is the preferred cell in which mobile terminals should make initial contact with the base station, i.e., random access requests for a communications connection for a regular dedicated channel, an enhanced uplink dedicated channel, a shared channel, etc. In order to avoid random access in cell 2 using the second frequency carrier that allows a higher RoT, a cell selection parameter can be used. One non-limiting example of a cell selection parameter includes one or more cell individual offsets (CIOs).

Normally, mobile terminals read system information in broadcast messages transmitted from each base station cell detected by the mobile terminal. The mobile terminal measures the downlink signal quality of each cell's downlink signal, e.g., the path gain, received code signal power (RCSP), etc. In one or more broadcast messages transmitted from the base station in the service area, receiving mobile terminals receive not only identification information identifying uplink frequency carriers for cells supported by the base station but also one or more cell individual offsets to be applied when measuring the signal quality of those received broadcast signals from the first and second cell downlink frequencies. The mobile terminal adds one or more cell individual offsets to the measured downlink signal quality values. It then compares the signal quality measurements and transmits a random access request for a communications connection in the cell having the highest quality value using the uplink frequency carrier corresponding to that cell. By employing a higher cell individual offset for the low-RoT radio frequency carrier 1 associated with the larger coverage cell 1 and possibly a lower or a negative cell individual offset for at the high-RoT frequency carrier 2, the random access will be biased or directed to the low-RoT frequency carrier 1. This ensures that mobiles in the base station's coverage area are able to make random access requests. If random access requests were made in the second cell using the second frequency carrier, some of those requests might be denied access because the high load and RoT permitted in the second cell reduces the size of the area in which mobile terminals can successfully make random access. If many mobile terminals make random accesses in cell 2, each at a higher power level in order to compensate for the high load level in the cell, then valuable uplink resources intended for high data rate communications are wasted.

Although the initial random access is directed to the first cell 1 and to the associated first carrier frequency, selection of the particular one of the co-sited cells depends on one or more factors. Preferably, the co-sited cell selection occurs before the requested uplink connection is set up in order to avoid handover signaling and potential interruption of the connection. But the co-sited cell selection may also occur as an inter-frequency handover after the connection is set up. For example, the connection might initially be set up in co-sited cell 2 on frequency F2, but due to a change in condition, need or at the request of the mobile terminal or the network, it might be decided that the connection should be shifted to co-sited cell 1. In this case, an inter-frequency handover would be performed of the connection to co-sited cell 1 on frequency F1. The mobile terminal may enter a compressed mode, i.e., transmit and/or receive discontinuously, in order to free up time for measurements on the other frequency. Operating in compressed mode "costs" additional radio resources, and thus, usually should be used sparingly in the network. The mobile terminal then reports radio conditions for a number of candidate cells on the other frequency, and the network moves (hands over) the downlink and uplink connections, e.g., in a similar fashion as when they were setup.

Figure 5:
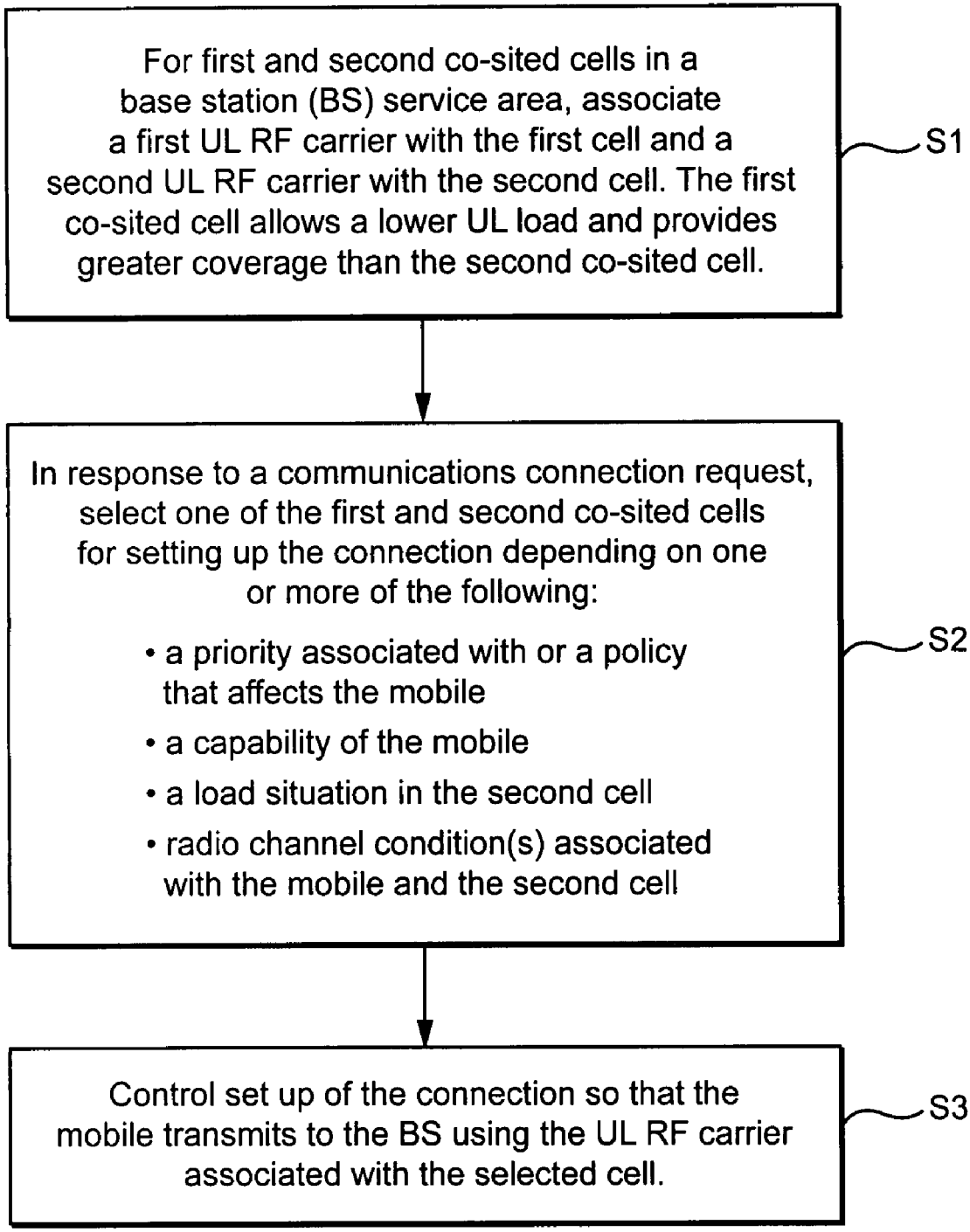
FIG. 5 is a flowchart showing non-limiting example procedures for selecting one of the two co-sited cells for setting up a communications connection requested by a mobile terminal.

FIG. 5 is a flowchart showing non-limiting example procedures for selecting one of the two co-sited cells for setting up a communications connection requested by a mobile terminal in a random access request preferably made from the first cell via the first RF carrier. FIG. 5 assumes that co-sited cell selection occurs at the connection set up, but again, the co-sited cell selection could be made after the connection is set up by performing an inter-frequency handover of the connection from the current serving co-sited cell to the selected co-sited cell.

Step S1 indicates that the first and second cells are co-sited in the base station's service area. The first cell is associated with a first uplink (UL) radio frequency (RF) carrier, and the second cell is associated with a second uplink (UL) radio frequency (RF) carrier. The first cell allows a lower UL load and RoT to provide a greater coverage area (particularly for random access requests) than the second cell. In response to a random access request from a mobile terminal, one of the first and second cells is selected for setting up the connection depending on one or more factors (step S2). Once the cell is selected, the connection is set up so that the mobile terminal transmits to the base station using the uplink RF carrier associated with the selected cell (step S3).

One non-limiting example factor is a priority associated with the mobile terminal (e.g., a high priority indicates selection of the second cell). Another is a policy that affects the mobile terminal (e.g., roaming terminals require a special subscription to have access to the second cell). Another example factor is a capability of the mobile terminal. It does not make sense to select the second cell for a mobile terminal that does not have the capability to transmit at the higher data rates. Another example factor is a load situation in the second cell. If the second cell is overloaded or congested, then this may indicate a need to select the first cell at least until the load in the second cell decreases. Another example factor is the current radio channel condition associated with the mobile terminal transmitting and/or receiving in the second cell. Even if the load in the second cell is low or the mobile terminal is a high priority terminal, selecting the second cell is not helpful if the current radio channel conditions prevent use of the higher uplink transmission rate or the interference that would generated by the mobile terminal transmitting at the power needed under the radio conditions in order to transmit at the higher rate is excessive.

Figure 6:
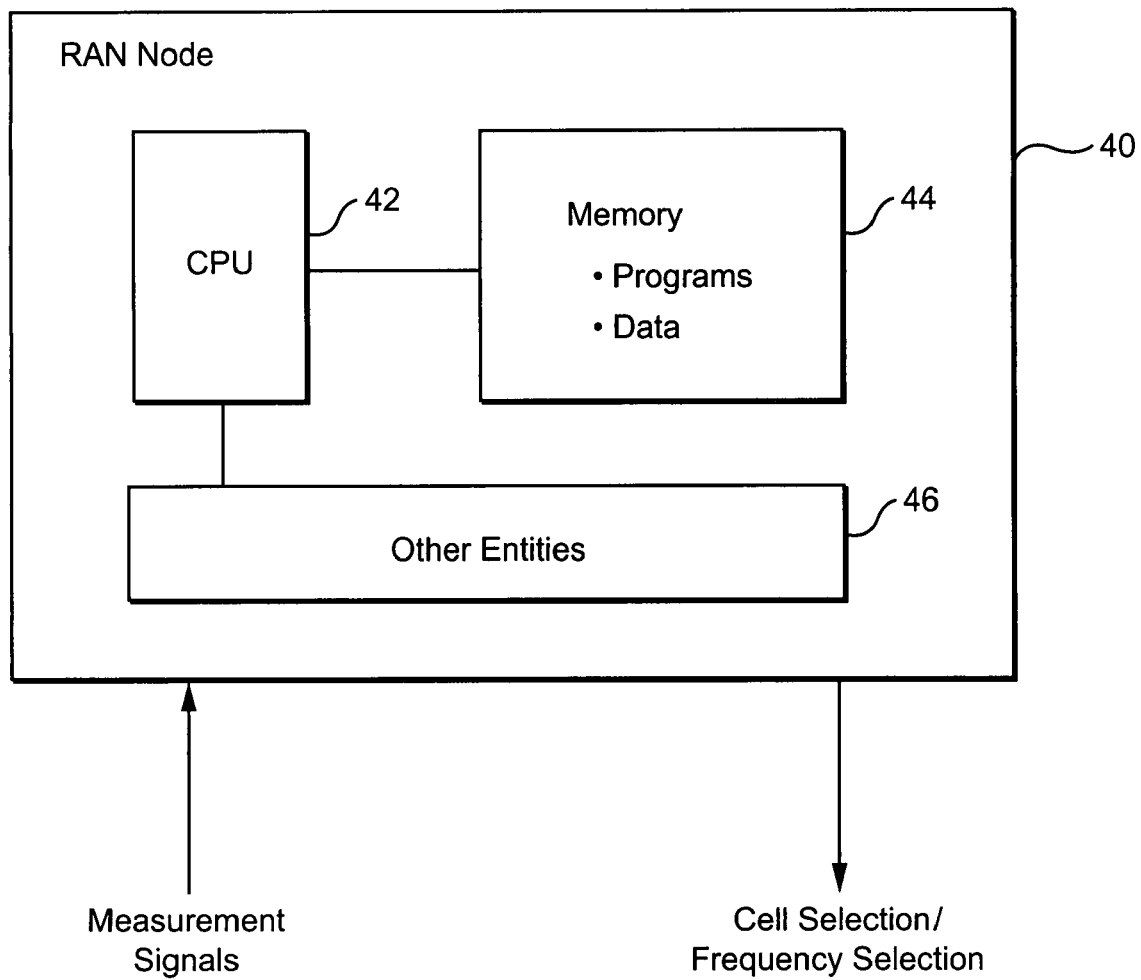
FIG. 6 is a function block diagram illustrating a radio access network (RAN) node for implementing the procedures of FIG. 5.

FIG. 6 is a function block diagram illustrating a radio access network (RAN) node 40 for implementing the procedures of FIG. 5. The RAN node could be an RNC, for example, in a UMTS type RAN or it could be a base station, for example, in a LTE type RAN. The RAN node 40 may be implemented using logic circuitry, e.g., a programmed computer, a DSP, a PAL, or other logic circuits. A computer implementation is shown in FIG. 6 with a central processing unit (CPU) 42 that executes instructions for carrying out the steps described above in accordance with program code and data stored in a memory 44. The CPU 42 may also be used to control other entities 46 and perform other operations. The RAN node 40 receives various measurements from the mobile terminal (and possibly from the base station if the RAN node is implemented in an RNC) and ultimately generates a cell/frequency selection.

Figure 7:
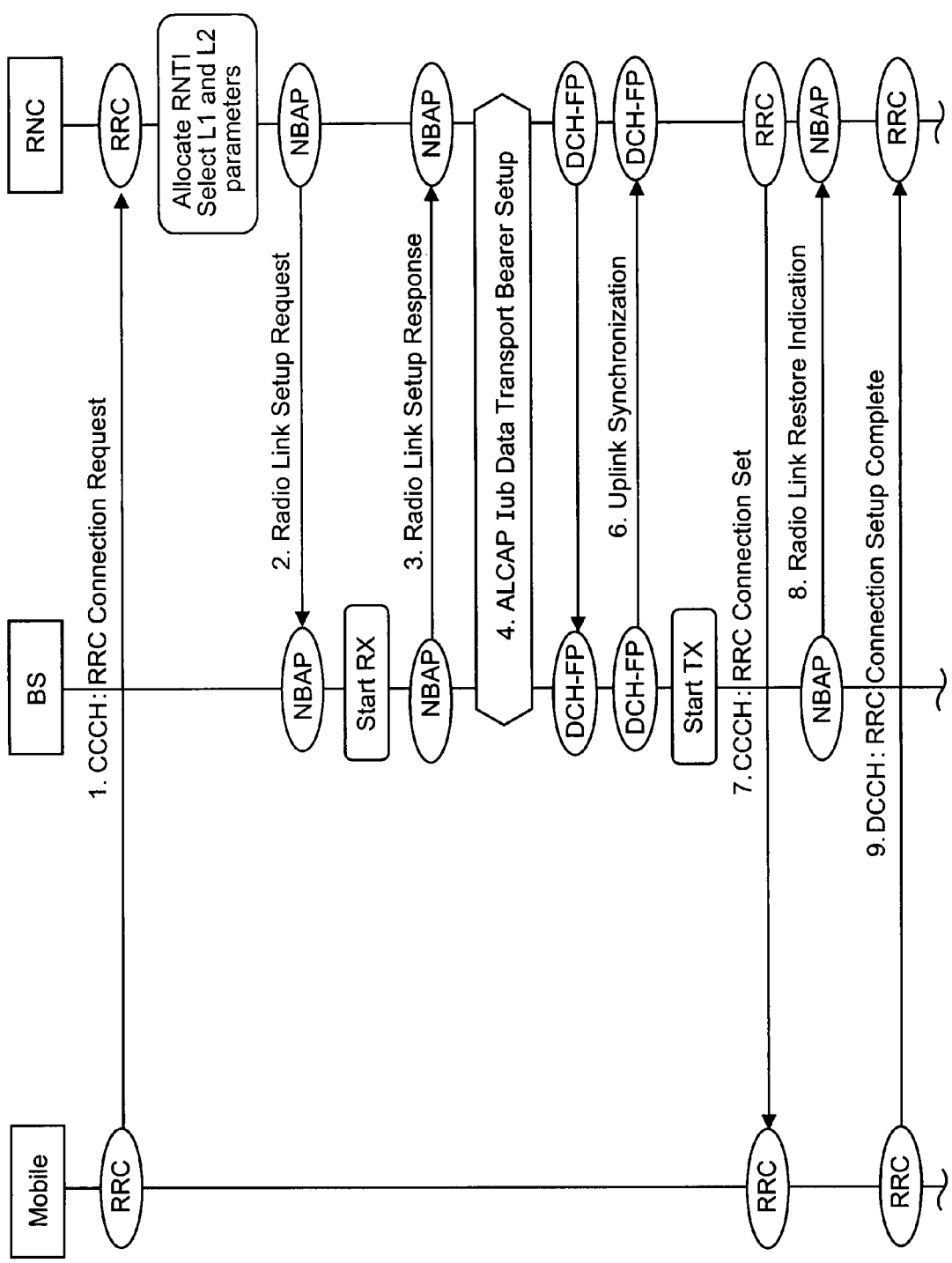
FIG. 7 is a signaling diagram showing non-limiting example signals for setting up a connection in a selected one of the co-sited cells in a non-limiting example UMTS type system.

FIG. 7 is a signaling diagram showing non-limiting example signals for setting up a connection in a selected one of the co-sited cells in a non-limiting example UMTS type system. The mobile terminal selects a most favorable co-sited cell (e.g., cell 1) for accessing the network preferably taking into account cell-individual offsets. The mobile tries to accessing the network by sending a random access message "RRC Connection Request" over a random access channel (RACH) (which is a common control channel, CCCH) to the most favorable cell (e.g., cell 1). The message is routed by that co-sited cell 1 and the base station (BS) to the RNC.

The RNC considers one or more co-sited cell selection factors such as those described above. For example, the RNC may consider the load situation of the second co-sited cell and whether another connection can be accommodated without jeopardizing the quality of service of the active connections in the second cell. Moreover, the RNC may estimate an uplink data rate that can be supported in cell 2 given measurements on the RACH made the mobile terminal for cell 2 in order to determine if the mobile terminal has sufficiently favorable radio conditions in order to benefit from the high data rate in cell 2.

The RNC decides whether the terminal should be connected to the first or to the second co-sited cell. The RNC sends a "Radio Link Setup Request" message to the BS over the node B applications protocol (NBAP) which includes a number of parameters such as cell id, transport format set, transport format combination set, the frequency at which the uplink connection will be setup, codes, etc. The BS allocates resources, starts reception on the physical layer, and responds with a message "Radio Link Setup Response." Various bearer and synchronization procedures are performed (see 4-6 in the figure) so that downlink transmission can begin, and the RNC sends an "RRC Connection Setup" message that includes among other parameters the frequency channel at which the up link will be setup) over a forward access channel (FACH) (another common control channel, CCCH). The mobile terminal synchronizes to the established downlink and starts uplink transmission over the selected frequency. The BS synchronizes to the uplink signal from the terminal and confirms that the connection is established by sending a "Radio Link Restore Indication" message over NBAP to the RNC. 8. The first message over this established dedicated channel is "RRC Connection Complete" from the mobile terminal to the RNC. With the connection established, the mobile terminal is in an RRC connected state, and control information, such as mobile terminal signal quality measurements, can be provided over a signaling radio bearer carried on the dedicated control channel. In order to send data over the connection, a radio bearer is set up using Radio Bearer Setup from the RNC to the mobile terminal, and a confirmation Radio Bearer Setup Complete from the mobile terminal (not shown). The transport formats that will be used for data communication are defined in this Radio Bearer Setup message and configure the bearer differently in the first and second co-sited cells to accommodate the difference in uplink data rates.

The RNC preferably, (though not necessarily), performs a link budget analysis to determine whether the mobile terminal can benefit from a higher data rate uplink connection in co-sited cell 2 (allows high RoT) over frequency 2 without being power limited, i.e., the transmit power needed to achieve the desired data rate due to the radio conditions is either more than the mobile terminal can transmit or more than is permitted in the co-sited cell. (Some other node could perform the link budget analysis). Based on knowledge about the mobile terminal's power class, uplink amplifiers per cell, RoT levels per cell together with the cell downlink signal quality measurements reported over RACH by the mobile terminal, the RNC calculates a link budget on the second frequency F2. The RNC obtains the downlink signal quality measurements reported over RACH by the mobile terminal for each of co-sited cells 1 and 2. The received total wideband power (RSCP), path gain, or path loss between the mobile and the base station for each cell is determined.

From the RSCP, it is possible to determine the path gain using, for example, CPICH power information. The RNC uses knowledge of the mobile's maximum power $p_{max}$ according to the mobile's power class, uplink amplifier information (tower-mounted amplifier TMA) $G_{TMA}$, current Received Total Wideband Power (RTWP), i.e., the total received signal power at the receiver), per frequency carrier F1 and F2 ($RTWP_{curr,1}$, and $RTWP_{curr,2}$), and the measurements on RACH per carrier $g_1$ and $g_2$ to determine the maximum signal-to-interference ratio $Ec/No_{ULmax}$:

$$Ec/NO_{ULmax\_dB} = p_{max\_dB} + g_{2\_dB} + G_{TMA\_dB} - RTWP_{curr,2\_dB}.$$

This equation uses dB, but any logarithmic scale will do. In linear scale, the equation is:

$$Ec/NO_{ULmax} = (p_{max} * g_2 G_{TMA}) / RTWP_{curr,2}$$

The determined maximum signal-to-interference ratio $Ec/No_{ULmax}$ may be compared to a configurable threshold that corresponds to a desired higher uplink bit rate, e.g., in the form of a desired transport format combination. If the signal-to-interference ratio $EC/No_{ULmax}$ exceeds the threshold, the second co-sited cell 2 and frequency 2 may be selected assuming other criteria (if any) are satisfied.

The technology described offers a number of advantages. First, base stations can provide random access service in a wider service area while at the same time offering high uplink data rate service to qualified mobile terminals in at least a portion of the service area. Second, by directing the mobile terminals to perform random access on the first frequency F1, rather than the second frequency F2, significant interference that would otherwise be generated by the random accesses and which would reduce the achievable data rates on F2 is eliminated. Third, receivers for the highly loaded carrier need not support interference cancellation. But even with interference cancellation capability, such advanced receivers will not be able to take advantage of that capability during random access.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for ensuring random access coverage while supporting high uplink data rates in a same service area served by a base station having a radio access technology, the service area including first and second co-sited cells both served by the base station using the radio access technology, comprising:
    associating the first co-sited cell with a first uplink radio frequency carrier assigned to the base station and using the radio access technology and the second co-sited cell with a second uplink radio frequency carrier assigned to the base station and using the radio access technology, where the first co-sited cell allows a lower uplink load using the radio access technology and provides a greater coverage than the second co-sited cell using the radio access technology;
    in response to a random access request for a communications connection involving the mobile radio terminal, selecting one of the first and second co-sited cells in which to support the communications connection between the mobile radio terminal and the base station depending on one or more factors;
    controlling the communications connection so that the mobile radio terminal transmits to the base station using the uplink radio frequency carrier associated with the selected co-sited cell, the method further comprising:
    based on the one or more factors, determining that the requested communications connection is not permitted in the second co-sited cell at a higher uplink data rate, wherein the one or more factors includes: a uplink load of the second co-sited cell exceeding a configurable load threshold, the mobile terminal is capable of transmitting at the higher uplink data rate, the load situation in the second co-sited cell will permit the mobile terminal to transmit at the higher uplink data rate in the second co-sited cell, and current radio channel conditions associated with the mobile radio terminal in the second co-sited cell will permit the mobile terminal to transmit at the higher uplink data rate in the second co-sited cell;
    selecting the first co-sited cell; and
    controlling the set up of the requested communications connection with the mobile terminal in the first co-sited cell over the first uplink radio frequency carrier.

2. The method in claim 1, further comprising:
    determining a cell selection parameter for directing random access channel requests from mobile radio terminals to be transmitted from one or both of the first and second co-sited cells that biases random access requests from mobile radio terminals towards using the first uplink radio frequency carrier associated with the first cell.

3. The method in claim 2, wherein the cell selection parameter includes one or more cell offset values broadcasted in a system broadcast message from one or both of the first and second co-sited cells.

4. The method in claim 1, wherein the controlling includes initially setting up the communications connection so that the mobile radio terminal transmits to the base station using the uplink radio frequency carrier associated with the selected co-sited cell.

5. The method in claim 1, wherein the controlling includes handing over the communications connection so that the mobile radio terminal transmits to the base station using the uplink radio frequency carrier associated with the selected co-sited cell.

6. The method in claim 1, wherein the one or more factors includes a priority or a capability associated with the mobile terminal associated with the mobile terminal.

7. The method in claim 1, wherein the one or more factors includes current radio channel conditions associated with the mobile terminal and the second co-sited cell.

8. The method in claim 1, further comprising:
    based on the one or more factors, determining that a requested uplink connection with the mobile terminal is permitted in the second co-sited cell at a higher uplink data rate;
    selecting the second co-sited cell; and
    establishing the requested communications connection at the higher uplink data rate with the mobile terminal in the second co-sited cell over the second uplink radio frequency carrier.

9. The method in claim 1, further comprising determining whether current radio conditions are favorable for transmission at the higher uplink data rate in the second co-sited cell including:
    determining a maximum uplink signal-to-interference ratio associated with an uplink connection to the base station in the second co-sited cell;
    comparing the maximum uplink signal-to-interference ratio associated with the mobile terminal to a threshold; and
    based on the comparison, determining whether the uplink connection may be permitted to transmit at the uplink higher data rate in the second co-sited cell,
    wherein a higher maximum signal-to-interference ratio corresponds to a higher possible maximum data rate.

10. The method in claim 9, wherein the maximum uplink signal-to-interference ratio associated with the mobile terminal is determined based on a maximum transmit power of the mobile terminal, base station receiver uplink amplifier information, a rise over thermal value for at least one of the first and second uplink radio frequency carriers, and a path gain associated with the at least one of the first and second uplink radio frequency carriers.

11. The method in claim 10, wherein the threshold is related to the higher uplink data rate, and if the maximum uplink signal-to-interference ratio associated with the mobile terminal exceeds the threshold, the method further comprises:
    selecting the second co-sited cell, and
    setting up the requested communications connection to support the higher uplink data rate with the mobile terminal in the second co-sited cell over the second uplink radio frequency carrier.

12. The method in claim 1 implemented in a radio network controller coupled to the base station in a universal mobile telecommunications system (UMTS) mobile radio communications system.

13. The method in claim 1 implemented in the base station in a long term evolution (LTE) mobile radio communications system.

14. Apparatus for ensuring random access coverage while supporting high uplink data rates in a same service area served by a base station having a radio access technology, the service area including first and second co-sited cells both served by the base station using the radio access technology, comprising:
   programmable logic circuitry configured to:
      associate the first co-sited cell with a first uplink radio frequency carrier assigned to the base station and using the radio access technology and the second cell with a second uplink radio frequency carrier assigned to the base station and using the radio access technology, where the first co-sited cell allows a lower uplink load using the radio access technology and provides a greater coverage than the second co-sited cell using the radio access technology;
      in response to a random access request for a communications connection involving the mobile radio terminal, select one of the first and second co-sited cells in which to support the communications connection between the mobile radio terminal and the base station depending on one or more factors;
      control the communications connection so that the mobile radio terminal transmits to the base station using the uplink radio frequency carrier associated with the selected co-sited cell, the programmable logic circuitry configured to:
      determine whether current radio conditions are favorable for transmission at the higher uplink data rate in the second co-sited cell including:
      determine a maximum uplink signal-to-interference ratio associated with an uplink connection to the base station in the second co-sited cell;
      compare the maximum uplink signal-to-interference ratio associated with the mobile terminal to a threshold; and
      based on the comparison, determine whether the uplink connection may be permitted to transmit at the uplink higher data rate in the second co-sited cell,
   wherein a higher maximum signal-to-interference ratio corresponds to a higher possible maximum data rate and based on a maximum transmit power of the mobile terminal, base station receiver uplink amplifier information, a rise over thermal value for at least one of the first and second uplink radio frequency carriers, and a path gain associated with the at least one of the first and second uplink radio frequency carriers,
   wherein threshold is related to the higher uplink data rate,
   wherein if the maximum uplink signal-to-interference ratio associated with the mobile terminal exceeds the threshold, and
   wherein the programmable logic circuitry is further configured to:
      select the second co-sited cell, and
      set up the requested communications connection to support the higher uplink data rate with the mobile terminal in the second co-sited cell over the second uplink radio frequency carrier.

15. The apparatus in claim 14, wherein the programmable logic circuitry is further configured to determine a cell selection parameter for directing random access channel requests from the mobile radio terminal to be transmitted from one or both of the first and second co-sited cells that biases random access requests from mobile radio terminals towards using the first uplink radio frequency carrier associated with the first co-sited cell.

16. The apparatus in claim 14, wherein the cell selection parameter includes one or more cell offset values broadcasted in a system broadcast message from one or both of the first and second co-sited cells.

17. The apparatus in claim 14, wherein the programmable logic circuitry is further configured to:
   determine that the requested communications connection is not permitted in the second co-sited cell at a higher uplink data rate based on the one or more factors,
   select the first co-sited cell, and
   control the set up or handover of the requested communications connection with the mobile terminal in or to the first co-sited cell over the first uplink radio frequency carrier.

18. The apparatus in claim 17, wherein the one or more factors includes a priority or a capability associated with the mobile terminal.

19. The apparatus in claim 17, wherein the one or more factors includes an uplink load of the second co-sited cell.

20. The apparatus in claim 19, wherein the one or more factors includes current radio channel conditions associated with the mobile terminal and the second co-sited cell.

21. The apparatus in claim 17, wherein the programmable logic circuitry is further configured to:
   determine that a requested uplink connection with the mobile terminal is permitted in the second co-sited cell at a higher uplink data rate based on the one or more factors;
   select the second co-sited cell; and
   control set up or handover of the requested communications connection at the higher uplink data rate with the mobile terminal in or to the second co-sited cell over the second uplink radio frequency carrier.

22. The apparatus in claim 21, wherein the one or more factors includes the mobile terminal is capable of transmitting at the higher uplink data rate, the load situation in the second co-sited cell will permit the mobile terminal to transmit at the higher uplink data rate in the second co-sited cell, and current radio channel conditions associated with the mobile radio terminal in the second co-sited cell will permit the mobile terminal to transmit at the higher uplink data rate in the second co-sited cell.

23. A mobile radio terminal for use with the base station incorporating the apparatus in claim 14.

24. A mobile radio terminal for use with a radio access network incorporating the apparatus in claim 14.

25. Apparatus for ensuring random access coverage while supporting high uplink data rates in a same service area served by a base station having a radio access technology, the service area including first and second co-sited cells both served by the base station using the radio access technology, comprising:
   means for associating the first co-sited cell with a first uplink radio frequency carrier assigned to the base station and using the radio access technology and the second co-sited cell with a second uplink radio frequency carrier assigned to the base station and using the radio access technology, where the first co-sited cell allows a lower uplink load using the radio access technology and provides a greater coverage than the second co-sited cell using the radio access technology;

means for selecting one of the first and second co-sited cells in which to support the communications connection between the mobile radio terminal and the base station based on two or more of the following: a priority associated with the mobile radio terminal, a capability associated with the mobile radio terminal, a load situation in the second cell, or radio channel conditions associated with the mobile radio terminal;

means for controlling the communications connection so that the mobile radio terminal transmits to the base station using the uplink radio frequency carrier associated with the selected co-sited cell, means, based on the one or more factors, for determining that the requested communications connection is not permitted in the second co-sited cell at a higher uplink data rate, wherein the one or more factors includes: a uplink load of the second co-sited cell exceeding a configurable load threshold, the mobile terminal is capable of transmitting at the higher uplink data rate, the load situation in the second co-sited cell will permit the mobile terminal to transmit at the higher uplink data rate in the second co-sited cell, and current radio channel conditions associated with the mobile radio terminal in the second co-sited cell will permit the mobile terminal to transmit at the higher uplink data rate in the second co-sited cell;

means for selecting the first co-sited cell; and means for controlling the set up of the requested communications connection with the mobile terminal in the first co-sited cell over the first uplink radio frequency carrier.

* * * * *

UNITED STATES PATENT AND TRADEMARK OFFICE
CERTIFICATE OF CORRECTION

PATENT NO. : 7,881,722 B2  Page 1 of 1
APPLICATION NO. : 11/730575
DATED : February 1, 2011
INVENTOR(S) : Gunnarsson et al.

It is certified that error appears in the above-identified patent and that said Letters Patent is hereby corrected as shown below:

In Column 7, Line 58, delete "RNC. 8." and insert -- RNC. --, therefor.

In Column 8, Line 35, in Equation, delete "Ec/NO" and insert -- Ec/No --, therefor.

In Column 8, Line 40, in Equation, delete "Ec/NO" and insert -- Ec/No --, therefor.

In Column 8, Line 46, delete "EC/NO$_{ULmax}$" and insert -- Ec/No$_{ULmax}$ --, therefor.

Signed and Sealed this
Twenty-third Day of August, 2011

David J. Kappos
*Director of the United States Patent and Trademark Office*